O. H. AMES.
AUTOMOBILE JACK TRUCK.
APPLICATION FILED FEB. 2, 1911.
1,014,992.
Patented Jan. 16, 1912.
2 SHEETS—SHEET 1.
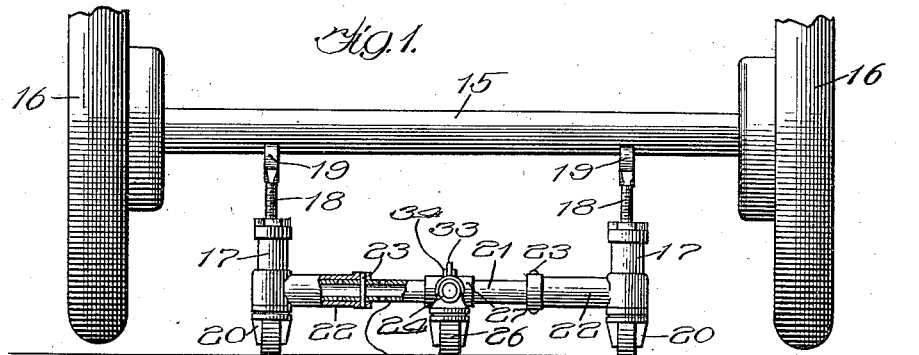
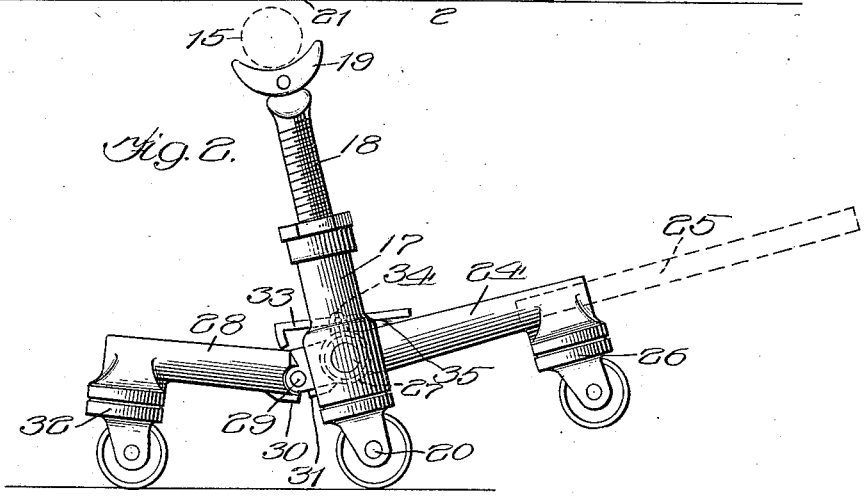
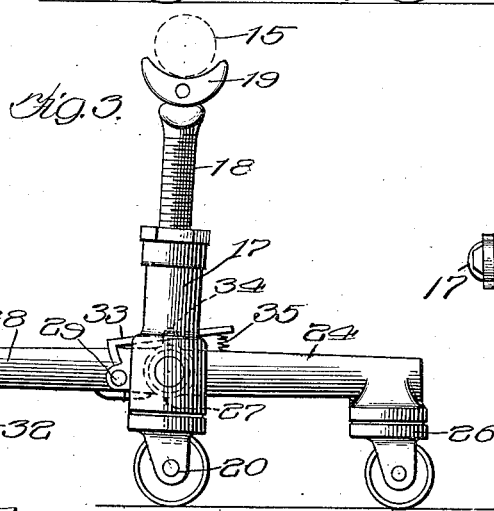
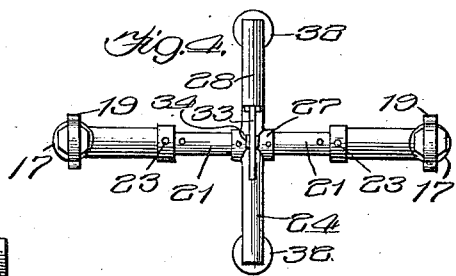

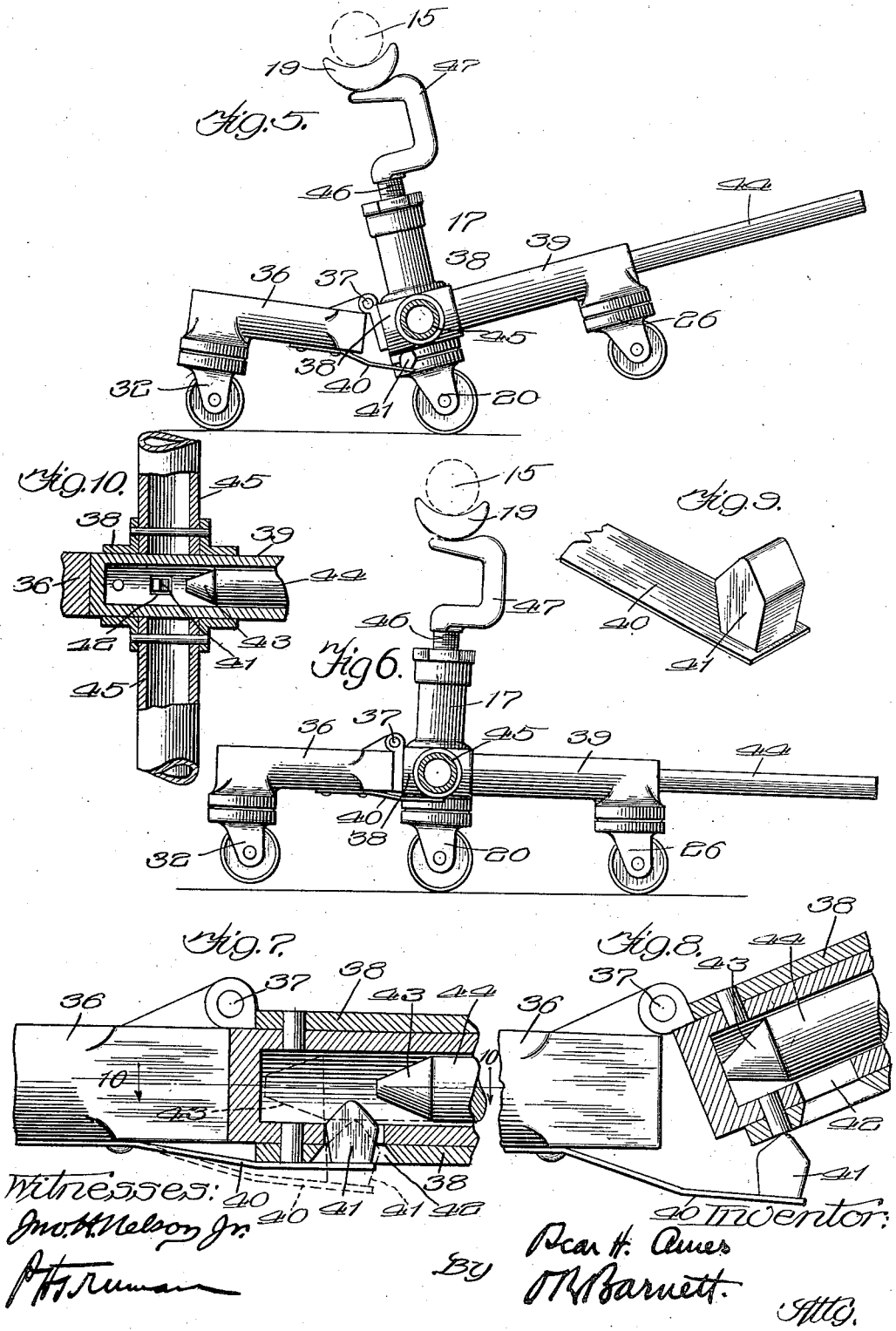

UNITED STATES PATENT OFFICE.

OSCAR H. AMES, OF COAL HILL, PENNSYLVANIA, ASSIGNOR OF ONE-HALF TO ROBERT McCALMONT, OF FRANKLIN, PENNSYLVANIA.

AUTOMOBILE JACK-TRUCK.

1,014,992.     Specification of Letters Patent.     Patented Jan. 16, 1912.

Application filed February 2, 1911. Serial No. 606,193.

*To all whom it may concern:*

Be it known that I, OSCAR H. AMES, a citizen of the United States, residing at Coal Hill, in the county of Venango and State of Pennsylvania, have invented certain new and useful Improvements in Automobile Jack-Trucks, of which the following is a specification.

My invention relates to an automobile jack truck, and has for its object to provide certain novel and improved constructions, arrangements and devices in automobile jack trucks which will be hereinafter described and claimed.

A primary and specific object of the invention is to improve upon the type of jack truck shown in my pending application Serial No. 526,397, filed November 5, 1909, the improvement consisting in providing the device with means for effectually preventing it, under all conditions, from dumping its load. Experience has shown that where an automobile is supported on a pair of jack trucks of the kind referred to, and the automobile is moved from place to place there is a tendency, particularly when the floor or other surface over which the machine is moved is rough or uneven, for one or other of the jack trucks to tilt out of its operative position under the axle. This tendency to unstability is prevented by the construction shown herein.

The improvements constituting the present invention are illustrated in the accompanying drawings, wherein—

Figure 1 shows an elevation of an automobile jack truck, with certain parts in section, the device being shown as supporting the front axle of an automobile; Fig. 2, an end elevation of the device with the parts in the position which they assume when the device is first applied to the axle; Fig. 3, a similar view showing the parts in their operative position; Fig. 4, a plan view of the jack truck; Figs. 5 and 6, sectional elevations of a modified form of device, showing the parts in different positions; Figs. 7 and 8, fragmentary sectional views illustrating the form of locking mechanism shown in Figs. 5 and 6, Fig. 9, a fragmentary view, in perspective, of the latch, and Fig. 10, a fragmentary sectional plan showing the parts illustrated in Figs. 7 and 8.

Like characters of reference indicate like parts in the several figures of the drawings.

Referring first to Figs. 1 to 4 inclusive, 15 designates an axle of an automobile, the wheels of which are shown diagrammatically at 16. 17, 17 are standards formed with threaded sockets to receive the threaded stems 18 of the axle supporting devices 19, which may be of any preferred construction, and provided at their lower ends with rollers, preferably with the swiveled casters 20. The standards 17 are rigidly connected with a cross piece formed of the two sections 21, 21. For example, the standards may be formed with sockets 22 which extend over the ends of the cross piece and are secured thereto by the pins 23. The sections 21 forming the cross piece are secured in a cross 27 to which is secured a longitudinal sustaining member 24, the latter being preferably made hollow so as to receive the end of the extension piece or lever 25. The sustaining member 24 is preferably provided with a caster 26. At the other side of the cross piece is a sustaining member which has a hinged relationship with the rigid structure above described. For example, in the particular construction shown, the sustaining member 28 is hinged, by means of a pivot 29, to the cross 27. Preferably the sustaining member 28 and the cross 27 are formed with abutments 30, 31 which come together in such manner that with the roller of caster 26 in contact with the ground the roller of the similar caster 32 on the hinged sustaining member 28 is raised a trifle above the ground. This arrangement is not essential. The purpose of it is to facilitate the movement of the jack truck by making it a three wheel instead of a four wheel truck. The hinged relationship of the rocking portion of the truck and the sustaining member 28 is to permit the former to be turned into the oblique position which it assumes when first applied to the axle. In order to give a rigid relation between the sustaining member 28 and the rocking portion of the device when the latter is in its elevating or operative position, a locking mechanism is provided such as that shown in Figs. 1 to 4 inclusive or, preferably, such as that shown in Figs. 5 to 10 inclusive.

The locking mechanism of the first four figures consists of an angular dog 33 pivoted to a fork 34 on the cross 27, the end of which is adapted to project into the space between the edges of cross 27 and the longitudinal sustaining member 28. In order to make this engagement automatic with the rocking of the rigid portion of the device into its operative position, a coiled spring 35 is interposed between the dog and the rigid longitudinal member 24. In the arrangement shown in the first four figures the locking dog 33 has to be withdrawn from its locking position by the hand or foot when the standards are tilted for application to the axle. In the form of locking mechanism shown in Figs. 5 to 10 the lock is released by merely thrusting the extension piece or lever into its socket. In this preferred form of jack truck the forward sustaining member 36 is hinged by the pin 37 to the cross 38. The sustaining member 39 extends through and projects a trifle beyond the cross as shown in Figs. 7, 8 and 10. To the under side of the sustaining member 36 is secured a spring latch 40 provided with the beveled bolt 41 which is designed to enter a perforation 42 through the cross 38 and sustaining member 39. The tapered end 43 of the extension lever 44 engages with the bolt 41 when the lever is thrust into the member 39 and pushes bolt 41 out of its locking position. The cross piece rigidly connecting the standards with the member 39 is made in two sections 45, 45, as shown particularly in Fig. 10. The construction of the modification shown in Figs. 5 to 10 may be in other respects the same as that described in connection with Figs. 1 to 4.

In Figs. 5 and 6 I have shown the stems 46 of the axle supporting devices formed with off-sets 47 adapting the jack truck to be used in an axle having truss rods.

The operation of the jack truck above described is as follows: The truck is placed, with the axle supports 19 against the axle, with the rocking portion of the device tilted up as shown in Figs. 2 and 5. The extension lever 25 or 44, as the case may be, is put into the socket formed in the rigid sustaining member 24 or 39, and the rocking portion of the device rocked, with the rollers of casters 20 as a movable fulcrum, into the position shown in Figs. 3 and 6. This raises the axle in question enough to lift its wheels from the ground. With both axles supported in this way the automobile may be pushed from place to place. Any tendency of the jack trucks to turn out of position is counteracted by casters 32 coming into contact with the ground.

While I have described certain preferred constructions embodying my invention, it will be readily understood that there might be some structural modifications made without departure from my invention. Therefore I do not limit myself to the particulars shown and described except so far as the same are made specifically limitations on certain of the claims herein.

I claim:

1. A device of the character described, comprising in combination a pair of axle supports provided at their upper ends with means adapted to sustain the opposite ends of a vehicle axle and at their lower ends with rollers, a cross piece rigidly connected with said standards, means comprising a hand lever for rocking said standards into position to lift the axle of said vehicle, longitudinal sustaining members on opposite sides of said cross piece, and locking means for maintaining said standards in their elevating position.

2. A device of the character described, comprising a pair of axle supports provided at their upper ends with means adapted to sustain the opposite ends of a vehicle axle and at their lower ends with rollers, a cross piece connecting said standards, means comprising a hand lever for rocking said standards into position to lift the axle of said vehicle, longitudinal sustaining members on opposite sides of said cross piece, and locking means for maintaining said standards in their elevating position.

3. A device of the character described comprising a pair of axle supports in rigid relation to each other provided with a rolling bearing on the ground and adapted to be rocked so as to elevate the axle, and sustaining members on opposite sides of said supports, one of which is rigid with said supports and the other having a hinged relation thereto.

4. A device of the character described comprising a pair of axle supports in rigid relation to each other provided with a rolling bearing on the ground and adapted to be rocked so as to elevate the axle, sustaining members on opposite sides of said supports, one of which is rigid with said supports, and the other having a hinged relation thereto, and a locking mechanism for holding the hinged sustaining member in rigid relationship with the rest of the structure.

5. In a device of the character described, the combination with axle supports provided at their lower ends with rollers, of a cross piece to which said supports are rigidly connected, a longitudinal sustaining member rigid with said cross piece, a longitudinal sustaining member hinged to the other side of said cross piece, and locking mechanism for holding said hinged sustaining member in rigid relationship with the rest of the structure when the axle supports are in operative position.

6. In a device of the character described, the combination with axle supports provided at their lower ends with rollers, of a cross piece to which said supports are rigidly connected, a longitudinal sustaining member rigid with said cross piece, a longitudinal sustaining member hinged to the other side of said cross piece, locking mechanism for holding said hinged sustaining member in rigid relationship with the rest of the structure when the axle supports are in operative position, and rollers on the extremities of said longitudinal supporting members.

7. In a device of the character described, the combination with axle supports provided at their lower ends with rollers, of a cross piece to which said supports are rigidly connected, a longitudinal sustaining member rigid with said cross piece, a longitudinal sustaining member hinged to the other side of said cross piece, locking mechanism for holding said hinged sustaining member in rigid relationship with the rest of the structure when the axle supports are in operative position, and a lever to rock said axle supports adapted to engage with and release said locking mechanism.

8. In a device of the character described, the combination with axle supports provided at their lower ends with rollers, of a cross piece to which said supports are rigidly connected, a longitudinal sustaining member rigid with said cross piece, a longitudinal sustaining member hinged to the other side of said cross piece; the rigid sustaining member being hollow and formed with a perforation, a latch on said hinged sustaining member adapted to extend into said perforation in the rigid sustaining member, and a removable lever adapted to be received in said rigid sustaining member and to force said latch out of locking position.

9. In a device of the character described, the combination with a rigid axle supporting structure provided with rollers and adapted to be rocked so as to elevate the axle, of a longitudinal sustaining member hinged thereto, a latch for holding said rigid structure and sustaining member in rigid relation, and a removable lever for rocking said rigid structure adapted to disengage said latch.

10. In a device of the character described, the combination with a rocking structure comprising a pair of axle supports provided at their upper ends with means adapted to sustain the opposite ends of a vehicle axle and a cross piece rigidly connecting said supports, of a longitudinally extending sustaining member with which said rocking structure has a hinged relation, and means comprising a hand lever for rocking said rocking structure into position to raise said axle.

11. In a device of the character described, the combination with a rocking structure comprising a pair of axle supports provided at their upper ends with means adapted to sustain the opposite ends of a vehicle axle and a cross piece rigidly connecting said supports, of a longitudinally extending sustaining member with which said rocking structure has a hinged relation, means comprising a hand lever for rocking said rocking structure into position to raise said axle, and means for locking said rocking structure in substantially rigid relation with said sustaining member.

OSCAR H. AMES.

Witnesses:
Jos. W. Barr,
Helen R. Steuart.

Copies of this patent may be obtained for five cents each, by addressing the "Commissioner of Patents, Washington, D. C."